Figure 1:
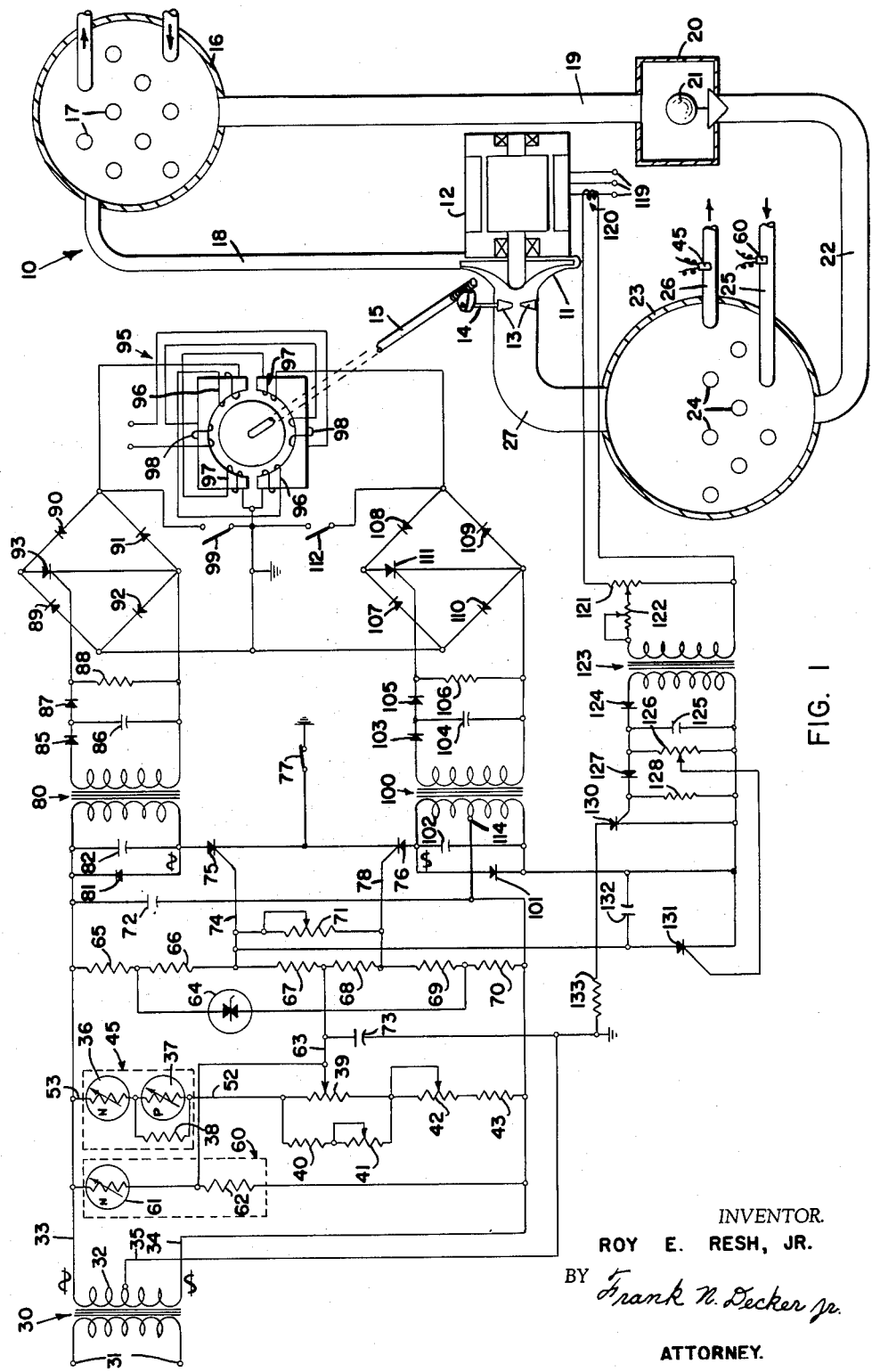

INVENTOR.
ROY E. RESH, JR.
BY *Frank N. Decker jr.*
ATTORNEY.

INVENTOR.
ROY E. RESH, JR.
BY
Frank N. Decker Jr.
ATTORNEY.

United States Patent Office 3,204,423
Patented Sept. 7, 1965

3,204,423
CONTROL SYSTEMS
Roy E. Resh, Jr., East Syracuse, N.Y., assignor to Carrier Corporation, Syracuse, N.Y., a corporation of Delaware
Filed Sept. 25, 1963, Ser. No. 311,455
19 Claims. (Cl. 62—215)

This invention relates to control systems, and, more particularly, to control systems suitable for use with air conditioning and refrigeration systems.

Accurate control of a refrigeration system requires a control system which integrates a number of independent factors in the system being controlled and applies this information to a control means. For example, it is desirable to take into account such factors as time lag in the system response, instantaneous operating condition of the system, as well as the apparent demand on the controlled system for increased or decreased capacity.

Considering a simple example, a primary temperature sensor in a water chiller may indicate that the water temperature is higher than the desired temperature, thus giving an apparent indication of a need for increased cooling capacity in the water chiller. However, if at the same moment the actual capacity of the water chiller or the change of temperature is monitored, it may be apparent that the machine capacity has already been corrected and the temperature is changing to provide the desired temperature, but that the machine has not been operating long enough to bring the chilled water down to the desired temperature. If the control system fails to integrate information concerning the present capacity of the refrigeration system or the changing condition of temperature with the information provided by the primary temperature sensor, the capacity of the refrigeration machine would be over-corrected, which could result in an unstable condition, often referred to as "hunting" wherein the temperature of the chilled water might fluctuate widely above and below the desired temperature, instead of smoothly approaching that temperature.

In the past, it has been frequent practice to provide separate control circuits which often work against each other, or various override circuits, to modify a main control system, in order to achieve the desired control objectives. This type of approach has often proved expensive and less than completely satisfactory.

Accordingly, it is a principal object of this invention to provide an improved control system wherein the desired control functions are balanced with respect to each other to achieve the type of control desired for a particular control system.

It is a further object of this invention to provide an improved control circuit which integrates the basic control information in an input stage to avoid redundant control functions.

It is a further object of this invention to provide an improved temperature responsive probe and method of sensing fluid temperature.

It is a further object of this invention to provide an improved control for an electric motor.

These and other objects of this invention are achieved in the illustrated embodiment thereof by providing suitable sensors in an alternating current bridge circuit, in combination with a phase discriminator and suitable solid state switching devices for controlling the operation of an electric motor, which in turn is adapted to control the operation of the controlled system.

For purposes of illustration, a preferred embodiment of this invention is shown wherein water is chilled by a refrigeration system of the type employing a centrifugal compressor having inlet guide vanes, or a damper, that controls the capacity of the refrigeration system. A probe which suitably utilizes a combination of temperature sensitive resistance elements having different thermal time constants is employed in the bridge circuit in a manner so as to sense instantaneous and preexisting conditions of water temperature so that the output of the bridge circuit is modified in a manner to reduce hunting. In addition, a suitable feedback potentiometer is located in the bridge circuit in a manner to further modify the output of the bridge circuit in accordance with the instantaneous capacity of the refrigeration compressor to provide increased stability and to further reduce hunting in the system.

The inlet guide vanes of the compressor are controlled by an electric motor having shading windings which control the direction of movement of the guide vanes. The shading windings supply power to a bridge rectifier circuit, which in turn supplies the power to a solid state switching device to either load or unload electrically the shading winding in accordance with the output of the bridge circuit. The entire control circuit may consist solely of solid state components to simplify manufacture and increase the reliability of the control system.

In addition, a suitable compressor motor over-current protection device is provided so that the refrigeration system is enabled to continue operation at maximum capacity during periods of peak refrigeration load, while at the same time not exceeding the maximum permissible motor current even if the demand for chilled water exceeds the safe capacity of the refrigeration system.

Figure 2:
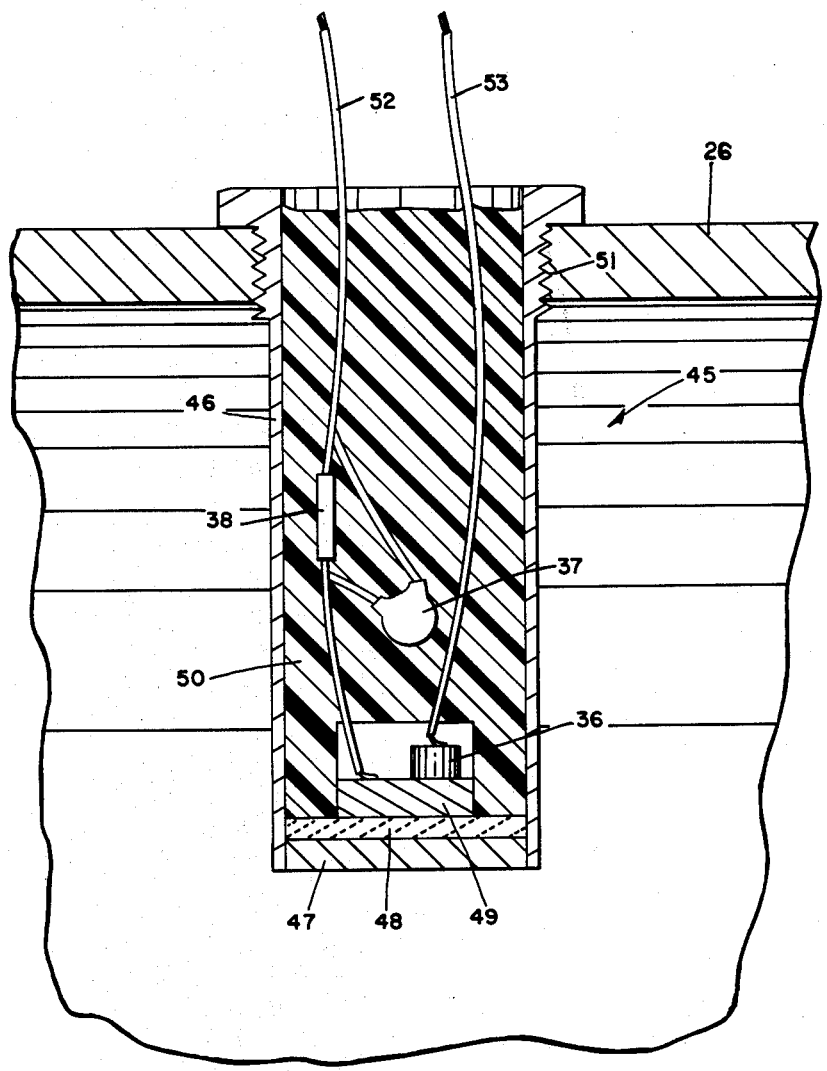

These and other objects of this invention will become more apparent by reference to the following specification and attached drawing wherein:

FIGURE 1 is a schematic diagram of a centrifugal refrigeration system having a control circuit in accordance with the present invention; and FIGURE 2 is a cross-sectional view through an improved temperature responsive probe in accordance with this invention.

Referring particularly to FIGURE 1, there is shown a refrigeration system 10 employing a centrifugal compressor 11 which is operated by electric motor 12. Compressor 11 has inlet or outlet guide vanes or damper 13 or other suitable means, such as a valve, which controls the capacity of the refrigeration system such as by regulating the passage of refrigerant vapor to the compresor, all of which can be referred to as a damper or throttling means. A suitable operator shaft 14 with an associated gear controls the position of damper 13 and a control shaft 15 having a mating worm gear thereon may be employed to rotate operator shaft 14.

Refrigeration system 10 further comprises a condenser 16 having suitable cooling water heat exchange tubes 17 and is connected to compressor 11 by vapor passage 18. As will be understood, refrigerant vapor is passed to and compressed by compressor 11. The compressed refrigerant vapor is then passed through vapor passage 18 to condenser 16 where the vapor is condensed by heat exchange with cooling water passed through heat exchange tubes 17.

The condensed refrigerant is passed through liquid passage 19 to a suitable accumulator 20 having a refrigerant restrictor or float valve 21 to meter passage of refrigerant through the system. The liquid refrigerant passes through refrigerant passage 22 into cooler 23.

Cooler 23 is provided with a plurality of water chilling tubes 24 having an entering chilled water line 25 and a leaving chilled water line 26 connected to tubes 24. Water to be chilled in the cooler passes through entering line 25 through tubes 24 where it is cooled by heat exchange with the evaporating refrigerant in the cooler. The chilled water is then withdrawn from the cooler through leaving chilled water line 26 and passes to a suitable remote heat exchanger (not shown) to provide the desired cooling, such as in a region to be air conditioned or refrigerated. After having passed through the remote heat exchanger, the water is again returned to the chiller through entering water line 25 for recooling.

Liquid refrigerant in cooler 23 is vaporized by absorption of heat from the water passing through tubes 24 and the vaporized refrigerant is passed through vapor line 27 past damper 13 to the inlet of centrifugal compressor 11 to complete the refrigeration cycle.

The control circuit for the refrigeration system includes a bridge circuit which is supplied by a power transformer 30 having its primary winding connected to alternating current line terminals 31. Power transformer 30 has a secondary winding 32 having a suitable tap thereon connected to conductor 35. The end terminals of secondary winding 32 are connected to conductors 33 and 34, which it will be appreciated carry currents which are substantially out of phase with respect to conductor 35. For convenience in description, conductor 33 may be considered to carry zero-phase voltage or current and conductor 34 may be considered to carry pi-phase voltage or current. The tap on secondary winding 32, to which conductor 35 is connected, is preferably a centertap. A series circuit is electrically connected between conductor 33 and conductor 34 consisting of thermistor 36, the parallel combination of thermistors 37 and resistor 38, the parallel combination of potentiometer 39 with the series combination of resistors 40 and 41, resistor 42, and resistor 43 as shown in the drawing.

It will be observed that the circuit so far described is an alternating current bridge having an output which may be taken between conductor 35 and the arm of potentiometer 39. It will also be observed that when the bridge circuit is balanced there will be no voltage output from the bridge, and that when the bridge is unbalanced the voltage output will be of either the zero-phase or the pi-phase depending upon the magnitude of the resistance between the arm of potentiometer 39 and conductors 33 and 34. For example, if the total resistance between the arm of potentiometer 39 and conductor 33 is less than the total resistance between the arm of potentiometer 39 and conductor 34, the output of the bridge circuit will be a zero-phase voltage having a magnitude which is a function of the ratio of these two resistances.

A probe 45, which may comprise thermistor 36, thermistor 37 and resistor 38 is provided in leaving chilled water line 26, as shown in greater detail in FIGURE 2. Probe 45 comprises a casing 46 having a good heat conducting bottom plate 47 in heat exchange relation with a thin, ceramic, electrically insulating disc 48, to which is secured a heat conducting base member 49 to which thermistor 36 is attached. Thermistor 36 is suitably and preferably of the negative temperature coefficient type. Intimate heat transfer relation is provided between thermister 36 and the ambient fluid, such as chilled water, flowing around bottom plate 47 of probe 45, so that thermistor 36 exhibits a relatively short thermal time constant, or in other words, a relatively short time lag in response to changes in temperature of the fluid medium. By making members 47, 48 and 49 of a relatively good heat conducting material, such as copper or certain ceramics, the thermal resistance between thermistor 36 and the ambient fluid, surrounding probe 45, may be made relatively low so as to provide as short a thermal time constant in the response of thermistor 36 as is desired.

A second thermistor 37, which may be suitably and preferably of the positive temperature coefficient of response type, is embedded within a body of a suitable epoxy resin or other material 50 within the interior of shell 46. By selection of suitable geometry or materials, the thermal time constant of thermistor 37 may be made greater than that of thermistor 36 because of the relatively higher thermal resistance path afforded between thermistor 37 and the ambient fluid. Consequently, the response of thermistor 37 lags behind that of thermistor 36 and thermistor 37 measures a preexisting condition of the refrigeration system.

As also shown in FIGURE 2, resistor 38 may desirably be embedded within epoxy resin 50 in the interior of probe 45 so that only two leads, 52 and 53, need be brought out of the exterior of the probe. Suitable securing means 51 are provided to attach the probe in leaving chilled water line 26.

It will be appreciated that many modifications of probe 45 may be made without departing from the scope of the invention. For example, thermistors 37 and 36 may comprise any temperature responsive resistance elements and need not necessarily have positive and negative temperature coefficients, respectively, by making suitable modifications and connections in the bridge circuit. If desired, thermistor 37 may be omitted or other negative controlled circuit information feedback may be employed instead. It is a desirable feature of probe 45, however, to provide thermal sensitive means such that the two temperature responsive resistance elements have differing thermal time constants so that one of the resistance elements senses the substantially instantaneous temperature of the ambient fluid, and the other temperature sensitive resistance element senses a temperature at some previous time, for reasons which will become more apparent. It is also within the scope of this invention to employ any suitable condition sensitive impedance elements, such as resistors or capacitors, which are responsive to any desired condition, such as temperature or humidity, which is sought to be controlled by the system employed. Such modifications are regarded as equivalents of the temperature sensitive resistance elements described.

Resistor 42 is preferably a variable resistance as shown in the drawing, and its setting controls the balance point of the bridge, or in other words, the set point or set temperature of the controlled system. As the resistance of resistor 42 is increased, the resistance of temperature probe 45 must become higher to balance the bridge circuit. Temperature probe 45 is designed so that thermistor 36, which is of the negative temperature coefficient type, has a resistance very much greater than the parallel combination of thermistor 37 and resistor 38 so that the probe exhibits a negative temperature coefficient characteristic. For example, thermistors 36 and 37 may each have a nominal resistance of about 10,000 ohms, and resistor 38 may have a resistance on the order of about 1,500 ohms. Accordingly, as the resistance of set point resistor 42 is increased, the bridge will be unbalanced until the temperature of the chilled water sensed by probe 45 drops.

A capacitor 73 is preferably connected between the centertap in power transformer 30 and conductor 63. This capacitor should have a capacitance which is substantially greater than the capacitance exhibited by probes 45 and 60 and their connecting leads so that changes in length and variations in probe and bridge capacitances do not materially affect the operation of the bridge circuit.

To illustrate the operation of the probe and bridge circuit thus far described, let it be assumed that the refrigeration system 10 is operating at some intermediate capacity such that it is supplying the required cooling capacity to a refrigeration or air conditioning load. If the refrigeration load rises, the temperature of the entering chilled water through line 25 will rise, and since the capacity of the refrigeration system has not yet changed, the temperature of leaving chilled water in line 26 will also rise. The resistance of thermistsor 36, because of its relatively short time constant, will decrease rapidly, thereby sensing the increased refrigeration load. This change in resistance of thermistor 36 will unbalance the bridge circuit causing a zero-phase signal output from the bridge at conductor 63, which is connected to the arm of potentiometer 39. As will be described later, this signal will cause the capacity of the refrigeration system to be increased.

After a short period of time, the resistance of thermistor 37 will begin to rise, but since the change in resistance of thermistor 36 is very much greater than the change in resistance of the parallel combination of thermistor 37 and resistor 38, this rise in resistance initially has only a slight effect on the unbalance of the bridge. Furthermore, the time constant of thermistor 37 is desirably on the order of about 40 seconds for a refrigeration system having a time constant of between 5 and 10 seconds. Consequently, transient variations in the load of the refrigeration system which are sensed by thermistor 36 having a time constant of the same order of magnitude or less of the refrigeration system will not be sensed by thermistor 37 because the correction in system capacity will take place before this thermistor can change temperature. Eventually the bridge will balance out at the set point temperature, though thermistor 37 will tend to slow down the system correction as will subsequently be explained.

If a severe and sustained increase in refrigeration load occurs, or if the set point determined by controlled potentiometer 42 is changed so that the refrigeration system is called upon to provide substantially increased capacity, thermistor 37 will tend to prevent overshooting in temperature. In this case, the resistance of thermistor 36 will be lower than normal for the desired equilibrium temperature of the system, as explained above, thereby causing an increase in capacity by opening damper 13 of compressor 11. However, as the desired set point temperature is reached, thermistor 37, because of its relatively long time constant, will have a resistance higher than it would if it responded to the instantaneous temperature in chilled water line 26. Consequently, thermistor 37 will offset to some extent the decreased resistance of thermistor 36, thereby making it appear that the refrigeration system has reached the set point slightly before this condition is actually achieved. This in turn will compensate for the time lag of the refrigeration system and results in a slowing down of the controlled circuit response as the set point is approached more closely by balancing the bridge before thermistor 36 has actually reached the desired final temperature.

Potentiometer 39 is a position feedback potentiometer which is functionally related to the instantaneous capacity of the refrigeration system. The arm on potentiometer 39 may be mechanically coupled by means, not shown, to shaft 14 and damper means 13 of compressor 11. In the circuit shown, the arm of potentiometer 39 would move downwardly as damper 13 opens to increase the instantaneous capacity of the refrigeration system. In this position, the position feedback potentiometer adds negative feedback of information which results in greater stability in the refrigeration system. If less stability, however, is desired, the potentiometer could be connected so as to move in the opposite direction in the circuit thereby resulting in positive feedback of information. Since thermistor 37 and potentiometer 39 both supply negative information feedback, either could be omitted if desired; however, it is preferred to include both elements because they provide greater stability and more accurate control.

To illustrate the operation of potentiometer 39, thermistors 36 and 37 may indicate a need for increased refrigeration capacity at a time when the chilled water temperature is dropping and the refrigeration system is capable of bringing the temperature of the chilled water down to the desired temperature in a short time. If the controlled system were permitted to still further increase the capacity of the refrigeration system, a serious undershoot in temperature might occur a few seconds later. For this reason, the output of the bridge circuit is taken from conductor 63, which is connected to the arm of potentiometer 39. In the event that the refrigeration system is working at high capacity, the added resistance in the leg of the bridge circuit between conductor 63 and conductor 33 tends to compensate for an apparent but unnecessary demand in capacity sensed by probe 45. This tends to stabilize the operation of the refrigeration system and prevent overshooting. On the other hand, probe 45 may indicate a satisfactory temperature condition in the chilled water line, but if damper 13 is closed to a position where the capacity of the refrigeration system is inadequate to maintain the satisfactory condition, it will be seen that potentiometer 39 will have a relatively small portion of its resistance in the leg of the bridge circuit between conductor 63 and conductor 33, and, accordingly, a zero-phase signal output will be provided from the bridge circuit. This zero-phase signal will cause an increase in the capacity of the refrigeration system as will be explained subsequently.

It will be observed therefore that position feedback potentiometer 39 tends to produce a reduction in hunting whether the capacity of the refrigeration system is either too high or too low for the condition being maintained in the chilled water line so that both undershooting or overshooting in temperature is minimized.

Resistor 40 and variable resistor 41 are provided in parallel with position feedback potentiometer 39 so as to adjust the range of feedback compensation or throttling range which may be provided in the circuit. It will be appreciated that when the resistance of variable resistor 41 is maximum, a maximum amount of feedback compensation is thereby provided since potentiometer 39 will then be enabled to have a greater effect on the total resistance of the bridge circuit.

A negative temperature coefficient thermistor 61 is preferably connected in parallel with one leg of the controlled bridge circuit between conductor 33 and conductor 63, and a fixed resistor 62 is connected in parallel with another leg of the bridge circuit between conductor 63 and conductor 34. Thermistor 61 and resistor 62 may be conveniently incorporated into a single reset probe 60 and inserted in entering chilled water line 25 of cooler 23.

Thermistor 61 integrates into the bridge circuit information concerning the temperature of the entering chilled water and modifies the output of the bridge circuit accordingly. Thus, if the temperature difference between the entering and leaving chilled water lines of the cooler is large, the reset probe serves the function of modifying the control signal output of the bridge circuit to compensate for the rise in leaving chilled water temperature which normally occurs due to the throttling range provided by potentiometers 39 and 41. The feedback provided by position feedback potentiometer 39 increases stability of the system, but also introduces a characteristic temperature droop at light refrigeration loads. Reset probe 60 compensates for this droop by resetting the balance point of the bridge circuit downwardly under conditions of heavy refrigeration load so as to reduce or eliminate the apparent droop in temperature with decreased loads. When the refrigeration system is operating at high capacity, the entering chilled water is at a relatively high temperature, which results in thermistor 61 assuming a relatively low resistance value. Since thermistor 61 is in parallel with the leg of the bridge circuit between conductors 63 and 33, it tends to cause the bridge circuit to balance at a lower than normal temperature under these conditions. However, under conditions of relatively light refrigeration load, the temperature of the entering chilled water drops and the resistance of thermistor 61 rises thereby reducing its effect on resetting the balance point of the bridge. In an extreme case, the resistance of thermistor 61 may be lower than the risistance of resistor 62 so as to add pi-phase voltage to cancel the zero-phase output of the previously described legs of the circuit, which would otherwise be obtained.

It will be observed thus far that the output of the bridge circuit integrates all of the information relating to entering chilled water temperature, leaving chilled water temperature, instantaneous refrigeration capacity, and previous operating condition of the refrigeration system into a single bridge circuit, and supplies this information to a control for the refrigeration system as either a zero-phase or a pi-phase voltage. This information is supplied to a phase discriminator circuit and then to a servomotor for operation of control shaft 15 of the refrigeration system.

The output of the bridge circuit is conducted through conductor 63 to the junction of resistors 67 and 68 of a voltage divider. Conductor 74 is connected to the voltage divider between resistors 66 and 67, and is connected to the gate or trigger means of a silicon control rectifier 75. A second output is taken from the junction of resistors 68 and 69 through conductor 78 and connected to the gate or trigger means of a second silicon controlled rectifier 76.

As will be seen, controlled rectifiers 75 and 76 form a phase discriminator circuit which is coupled to the output of the bridge circuit by substantially only non-reactive components to thereby minimize phase shift between these circuits.

The voltage dividing network consists of resistors 65, 66 and 67 and is connected across one leg of the bridge circuit between conductors 33 and 63, and a similar voltage dividing network consisting of thermistors 68, 69 and 70 are connected across the adjacent leg of the bridge circuit between conductors 63 and 64. A double anode zener diode 64 is connected between the junction of resistors 65 and 66 and the junction of resistors 69 and 70, as shown in the drawing. This diode provides voltage regulation to make the phase discriminator circuit insensitive to fluctuations in line voltage across terminals 31, which would be reflected in the voltage of secondary winding 32 by stabilizing the bias voltage on the gates of controlled rectifiers 75 and 76.

A variable resistor 71 is connected in parallel between conductors 74 and 78 to adjust the threshold of triggering of controlled rectifiers 75 and 76. By increasing the resistance of variable resistor 71, the gates of the controlled rectifiers 75 and 76 are biased more positive with respect to their cathodes thereby reducing the voltage output required from the bridge circuit to trigger them to a conducting state. In effect, this provides a variable "dead band" so that the capacity of the refrigeration system is not being constantly corrected due to slight transient variations in chilled water temperature.

The anode of controlled rectifier 75 is connected to one terminal of the primary winding of an isolation transformer 80, and the other terminal of the primary winding is connected to a conductor 33, which carries zero-phase voltage. A diode 81 and a capacitor 82 are connected in parallel with the primary winding of transformer 80. The cathodes of controlled rectifiers 75 and 76 are connected through ground by closed switch 77 to the center tap of secondary winding 32 of power transformer 30.

Assuming that the resistance of probe 45, for example, is lower than the bridge equilibrium resistance for a given setting of resistor 42, a zero-phase output voltage from the controlled bridge circuit is conducted through conductor 74 to the gate of controlled rectifier 75, causing it to conduct. When controlled rectifier 75 is triggered to a conducting condition, a current flows on the positive half cycle of the zero-phase voltage through the primary winding of transformer 80 and charges capacitor 82. On the second half cycle of the zero-phase voltage the anode of controlled rectifier 75 is driven negative and, therefore, the control rectifier ceases to conduct. However, capacitor 82 discharges into the primary winding of isolation transformer 80 so that a pulsating voltage is induced into the secondary winding of the transformer as long as the output of the bridge circuit is sufficient to trigger controlled rectifier 75 on the positive half cycles. Diode 81 protects controlled rectifier 75 from excessively high voltage spikes which might cause damage to it.

A servomotor 95 having main phase windings 98 is connected to a suitable source of alternating current. Servomotor 95 is shown as having a rotor member connected to shaft 15, which controls the capacity of the refrigeration system. Servomotor 95 is of the shaded pole type having shading windings 96 and 97. Shading windings 96, when electrically loaded, cause the motor to rotate in a direction to open damper 13 and increase the capacity of the refrigeration system. Shading windings 97, when electrically loaded, cause the servomotor to rotate in the opposite direction, thereby closing damper 13 and decreasing the capacity of the refrigeration system.

An alternating current is induced in shading windings 96 by the action of motor winding 98, and this current is rectified by being fed to the input of a bridge rectifier circuit consisting of diodes 89, 90, 91 and 92. A silicon controlled rectifier 93 is connected across the output of this bridge circuit. Therefore, when sufficient voltage appears on the gate of controlled rectifier 93, it is triggered to a conducting state, and it electrically loads shading windings 96, thereby causing an increase in the capacity of the refrigeration system.

The gate of controlled rectifier 93 is connected in series with diode rectifiers 85 and 87 to one terminal of the secondary winding of isolation transformer 80. The cathode of controlled rectifier 93 is connected to the other terminal of isolation transformer 80. A suitable capacitor 86 is connected between the junction of diodes 85 and 87 and the other terminal of the secondary winding of transformer 80, and a resistor 88 is connected between the gate of controlled rectifier 93 and the other terminal of the secondary winding of the transformer, as shown in the drawing. Diode 87 is connected so as to prevent the charging of capacitor 86 in a manner which would hold the gate of controlled rectifier 93 positive, and cause unwanted triggering thereof but capacitor 86 may be charged through diode 85 so as to maintain the gate of the controlled rectifier positive when a signal voltage is induced in the secondary winding of transformer 80. Resistor 88 prevents spurious firing of controlled rectifier 93 by maintaining a low-resistance path between the gate and its associated cathode.

It will be apparent therefore that when a zero-phase signal output from the bridge circuit causes controlled rectifier 75 to conduct, a positive pulse is conducted through diodes 85 and 87 to the gate of controlled rectifier 93. The controlled rectifier therefore becomes conducting and electrically loads shading windings 96 of servomotor 95 causing the servomotor to operate to make the desired increase in capacity of the refrigeration system. Since controlled rectifier 75 can only conduct on the positive half cycle of the zero-phase voltage in conductor 33, only a small increment in capacity change is effected in the refrigeration system on each half cycle during which controlled rectifier 75 conducts. When sufficient correction has been made in the capacity of the refrigeration system this fact is sensed by either feedback potentiometer 39 or probes 45 and 60 so that the bridge circuit ceases to provide sufficient zero-phase output voltage and both controlled rectifiers 75 and 93 remain in a non-conducting state until additional correction is required.

In a similar manner, there is provided a controlled rectifier 76 and isolation transformer 100 having diode 101 and capacitor 102 connected in parallel across its primary winding. Isolation transformer 100 is functionally similar to isolation transformer 80 except, for reasons which will become subsequently apparent, its primary winding may suitably have a center or other tap 114 connected to pi-phase conductor 34, rather than having the entire primary winding connected across half of the secondary winding of power transformer 30, as is shown in connection with isolation transformer 80. Isolation transformer 100 has a secondary winding connected in series with diode rectifiers 103 and 105 to the gate of a controlled rectifier 111. Controlled rectifier 111 is connected across the output of a bridge rectifier circuit having diodes 107, 108, 109 and 110, the input of which is connected across the output of shading windings 97 of servomotor 95. A suitable resistor 106 and capacitor 104 are connected across the secondary winding of isolation transformer 100 and serve a similar purpose as described in connection with isolation transformer 80.

If the capacity of refrigeration system 10 is too great, this fact is sensed by an undesirably high resistance in probes 45 or 60, or by the slider of feedback potentiometer 39 assuming a position of relatively low resistance between it and pi-phase conductor 34. Any one of these conditions produces a pi-phase output signal from the bridge circuit, which in turn triggers controlled rectifier 76 to a conducting state. When controller rectifier 76 is in a conducting state, current flows through the primary winding of isolation transformer 100 via centertap 114, which is connected to the power transformer through conductor 34. This pulse causes controlled rectifier 111 to be triggered to a conducting state thereby electrically loading shading winding 97, which causes servomotor 95 to move in a direction to decrease the capacity of the refrigeration system.

In the event that manual operation of the capacity of the refrigeration system is desired, switch 77 may be opened to remove the ground from the cathodes of controlled rectifiers 75 and 76 thereby preventing their being triggered to a conducting state, and shading windings 96 and 97 may be electrically loaded by manual operation of switches 99 and 112, which are desirably combined into a single-pole double-throw center-off switch.

The control system further includes means responsive to an excessive motor current drawn by compressor motor 12 to reduce the capacity of the refrigeration system so as to prevent damage to the motor without completely shutting down the refrigeration system. Motor current is sensed by current transformer 120, which is connected in the line supplying power from line terminals 119 to the main winding of motor 12. Current transformer 120 is connected to the primary winding of an isolation transformer 123 in series with variable resistor 122, which is connected to the arm of a current overload set point potentiometer 121, as shown in the drawing. The secondary winding of isolation transformer 123 has one terminal connected to the gate of a silicon controlled rectifier 130 in series with rectifier diodes 124 and 127. A filter capacitor 125 is connected across the terminals of the secondary winding, as is a load resistor 128. Potentiometer 126 is connected between the junction of diodes 124 and 127, and the other terminal of the secondary winding of transformer 123. The arm of potentiometer 126 is connected to the gate of silicon controlled rectifier 131. Controlled rectifier 130 has its anode connected through resistor 133 to the centertap of power transformer 30 by means of conductor 35, and the anode of controlled rectifier 131 is connected to the gate of controlled rectifier 75 through conductor 74. A bypass capacitor 132 is connected across controlled rectifier 131 to bypass switching transients. The cathodes of controlled rectifiers 127 and 131 are connected to the remaining terminal of isolation transformer 100, as shown in the drawing.

The setting of potentiometer 121 determines the voltage supplied to the primary winding of transformer 123 from current transformer 120, thereby controlling the sensitivity of the circuit to motor current in order to set an upper limit for the current drawn by various motors 12, which may be used in systems with which the control is adapted for use. Variable resistor 122 provides means to adjust the maximum current which is permitted to be drawn by any particular motor after potentiometer 121 has been set. When resistor 122 is in a minimum resistance position, it will be apparent that the sensitivity of the motor overload control circuit is at a maximum.

Assuming that the refrigeration system is operating normally, except for a motor current slightly in excess of a predetermined maximum current, a relatively small voltage will be induced in current transformer 120 and reflected in the secondary winding of isolation transformer 123. This current will be rectified by diodes 124 and 127, and appear on the gates of controlled rectifiers 130 and 131 as a positive voltage. Potentiometer 126 may have a resistance of the same order of magnitude as resistor 128, but due to the voltage drop through diode 127 and the adjusted position of potentiometer 126, the voltage on the gate of controlled rectifier 131 is somewhat greater than the voltage on the gate of controlled rectifier 130. By proper adjustment of potentiometer 126, a small current overload experienced by compressor motor 12 will cause controlled rectifier 131 to become conducting, while controlled rectifier 130 will remain non-conducting. When controlled rectifier 131 becomes conducting, it completes a current path between the gate of controlled rectifier 75 through the secondary winding of isolation transformer 100 to conductor 34 connected to the secondary winding of power transformer 30. It will be recalled that conductor 34 carries pi-phase voltage and, accordingly, controlled rectifier 75 is prevented from conducting by the presence of pi-phase voltage on its gate, which is out of phase with the zero-phase voltage on its anode.

Controlled rectifier 75 is therefore clamped in a non-conducting condition by loads slightly in excess of a predetermined motor current, which prevents any further increase in the capacity of refrigeration system 10 when the motor current approaches an overload condition and, consequently, the danger of further overloading the compressor motor is minimized.

If, however, the load continues to rise to a point where a larger compressor motor current is experienced than that required to trigger controlled rectifier 131, a higher voltage will be reflected in the secondary winding of transformer 123 by reason of a higher voltage induced in current transformer 120. After this voltage reaches a predetermined value, greater than that necessary to trigger controlled rectifier 131, controlled rectifier 130 will be triggered to a conducting state. When controlled rectifier 130 is triggered, it effectively connects the lower terminal of the primary winding of transformer 100 to the centertap on winding 32 of transformer 30, through resistor 133. Since terminal 114 of transformer 100 is connected directly to conductor 34 carrying pi-phase voltage, a relatively high voltage exists across the primary winding of isolation transformer 100. This voltage causes controlled rectifier 111 to be triggered to a conducting state thereby loading shading winding 97 to reduce the capacity of the refrigeration system.

When the capacity of the refrigeration system has been reduced by triggering of controlled rectifier 111 to a point where the current drawn by motor 12 is reduced to a safe value, controlled rectifier 130 ceases to conduct, but controlled rectifier 131 remains in a conducting state to clamp controlled rectifier 75 in a non-conducting condition. Accordingly, the capacity of the refrigeration system cannot be increased until a still further reduction in motor current renders controlled rectifier 131 non-conducting. However, the refrigeration system is permitted to operate at maximum safe capacity by this means even during periods of extreme load under which conventional control systems would take the refrigeration system off the line.

It will be understood that the circuit herein illustrated represents merely an illustrative preferred embodiment of the invention, and that many changes in the actual circuit employed in a particular instance may be made without departing from the scope of this invention. For example, the controlled rectifiers herein utilized are particularly convenient since they are solid state switch or conductance devices of high reliability which do not require moving mechanical parts. It should be apparent, however, that these devices represent merely one form of solid state switch means, and that other solid state switch or conductance devices, such as transistors, or electrical relays, can be used instead by appropriate circuit modification, which is within the expected skill of the art. In a like manner, mechanical relays and vacuum tube devices can be utilized to perform the switching functions in some cases, but for simplicity and reliability, an entirely solid state control circuit, such as the illustrated embodiment, is preferred. Further, a hydraulic motor may be used in place of motor 95 by suitable circuit modifications which is within the skill of the art. It is also within the skill of the art to select circuit component values and types, and to make circuit modifications so as to provide a suitable control circuit response for any particular application.

While the combination of functions shown has been described with specific reference to a refrigeration system, it will also be apparent that other systems or other types of controls may be provided utilizing the basic inventions disclosed herein. For example, instead of employing temperature probes, as shown in the illustrated embodiment, it is feasible to substitute humidity sensing probes where control of humidity functions is desired, or to add humidity sensing probes to the bridge circuit to obtain additional control of this function. Also, heating and ventilating systems may be controlled by a control circuit of the type herein described, if desired.

Other modifications and embodiments of the illustrated invention, within the scope of the following claims, will therefore become apparent to those skilled in the art.

I claim:

1. A control system for controlling the operation of a refrigeration machine to provide a desired temperature in a body to be cooled, said control system comprising:
   an alternating current bridge circuit including:
      a first temperature sensitive impedance element disposed in heat exchange relation with said body,
      a second temperature sensitive impedance element disposed in heat exchange relation with said body, said second temperature sensitive impedance element having a longer thermal time constant than said first impedance element,
      a transformer having a tapped secondary winding forming two legs of said bridge circuit and for supplying power to said bridge circuit, and
      an additional impedance element having an impedance which is a function of a desired temperature of said body; and
   phase discriminator means electrically connected to said bridge circuit, and responsive to the phase of the output signal of said bridge circuit, said phase discriminator having an electrical output serving to control the capacity of said refrigeration system.

2. A control system as defined in claim 1 wherein said bridge circuit further includes additional impedance means in at least one branch of said bridge having an impedance which is a function of the substantially instantaneous capacity of said refrigeration system so as to modify the control signal output of said bridge circuit in accordance with the instantaneous capacity of said refrigeration system.

3. A control system as defined in claim 2 wherein:
   said body to be cooled comprises a fluid cooled by said refrigeration machine,
   said first and second temperature responsive impedance elements are disposed in heat exchange relation with cooled fluid leaving said refrigeration machine, and
   said control system includes a third temperature sensitive impedance element in heat exchange relation with said fluid entering said refrigeration machine to reset the balance point of said bridge circuit under heavy refrigeration load conditions.

4. A control system as defined in claim 1 wherein:
   the capacity of said refrigeration system is controlled by a shaded pole motor having at least one shading winding, which causes the capacity of said refrigeration machine to change when loaded; and
   the output of said bridge circuit actuates means to load said shading winding in response to a change in demand sensed by said temperature sensitive resistance elements.

5. A control system as defined in claim 1 wherein said phase discriminator comprises solid state switch means having trigger means connected to the output of said bridge circuit and an electrode connected to the tap on said secondary winding, said solid state switch means being connected so that said switch is actuated upon the occurrence of output voltage from the bridge circuit existing between said trigger means and said one electrode.

6. A control system as defined in claim 5 wherein said trigger means is directly coupled to said bridge circuit solely through a substantially non-reactive circuit means to prevent undesired phase shifts.

7. A control system for a refrigeration machine of the type adapted to chill a fluid medium, said control system comprising:
   an alternating current bridge circuit including:
      a first leg comprising:
         a negative temperature coefficient resistance element disposed in heat exchange relation with the chilled fluid medium leaving said refrigeration machine,
         a positive temperature coefficient resistance element disposed in heat exchange relation with the chilled fluid medium leaving said refrigeration machine, said positive temperature coefficient resistance element having a thermal time constant of response greater than that of said negative temperature coefficient resistance element,
         a second negative temperature coefficient resistance element disposed in heat exchange relation with the fluid medium entering said refrigeration machine,
      a second leg comprising a secondary winding of a power transformer,
      a third leg comprising a secondary winding of a power transformer,
      a fourth leg comprising a resistance element having a resistance which is a function of the desired set point temperature of said medium to be chilled;
   a phase discriminator electrically connected to the output of said bridge circuit between said second and third legs and said first and fourth legs respectively, comprising:
      a pair of controlled rectifiers each having a gate and a pair of electrodes, both of said gates being connected to the output of said bridge circuit,
      an electrode of each of said controlled rectifiers being respectively connected to sources of alternating current which are substantially out of phase with respect to each other, so as to selectively conduct current only on the occurrence of a predetermined phase relationship between the output of said bridge circuit appearing on the gates of said controlled rectifiers and the phase of the potential appearing on said electrodes of said controlled rectifiers; and
   refrigeration capacity control means associated with said respective controlled rectifiers for increasing and decreasing the capacity of said refrigeration machine upon one or the other of said controlled rectifiers being triggered to a current conducting state.

8. In a system for moderating the temperature of a body, a control circuit comprising a bridge circuit for providing a control signal to a temperature moderating device, said bridge circuit comprising:
a first leg having a negative temperature coefficient temperature sensitive impedance element disposed in heat exchange relation with said body, and a positive temperature coefficient temperature sensitive impedance element disposed in heat exchange relation with said body;
a second leg having a transformer winding therein;
a third leg having a transformer winding therein;
a fourth leg having an impedance element which is a function of a desired set point temperature of said body; and
one of said temperature sensitive impedance elements having a slower thermal time constant than the other of said temperature sensitive impedance elements so that the control signal output of said bridge circuit is modified by a previously existing temperature condition of said body to reduce hunting in said system.

9. In a control circuit for a controlled system:
an alternating current bridge circuit comprising:
condition sensitive impedance means having an impedance which is a function of the condition being controlled,
variable impedance means having an impedance which is functionally related to a desired condition,
transformer means for supplying alternating current to said bridge circuit, said transformer means including a tapped secondary winding, said tapped secondary winding forming two legs of said bridge circuit and supplying power for the operation of said bridge circuit,
said bridge circuit being arranged to provide an output signal having a predetermined phase relationship depending on the conditions sensed by said bridge circuit;
a phase discriminator circuit including solid state switch means having electrodes connected to sources of alternating current potentials of substantially differing phase relationship derived from said transformer secondary winding, said switch means having trigger means connected to the output of said bridge circuit so that said switch means is selectively actuated to provide a control function in response to the occurrence of a predetermined phase relation between the voltage on said trigger means and the voltage on said electrodes, for controlling said system.

10. A control circuit as defined in claim 9 including a voltage dividing network connected in parallel across at least one of the legs of said bridge circuit and arranged so that the output of said bridge circuit may be taken at a resistance point in said voltage dividing network spaced from the junction of two of the legs of said bridge circuit so as to provide a dead band in the control characteristic of said control system.

11. A control circuit as defined in claim 9 including:
a control motor having at least one shading winding adapted to have an alternating current voltage induced therein,
a controlled rectifier and a rectifier circuit connected across said shading winding, and
circuit means to trigger said controlled rectifier upon the occurrence of a predetermined signal output from said phase discriminator circuit, to thereby control the operation of said motor by electrically loading said shading winding by passage of current through said controlled rectifier and said rectifier circuit.

12. A control system comprising:
a motor having at least one shading winding adapted to have an alternating current voltage induced therein,
a rectifier circuit connected to said shading winding to rectify the current induced therein to provide a unidirectional current output,
a solid state conductance means having trigger means for triggering said conductance means to an electrically conducting state, thereby controlling the operation of said motor by electrically loading said shading winding by passing current through said conductance means and said rectifier circuit.

13. In a temperature controlled system, a control arrangement for a temperature modifying system having a finite time lag between the generation of a temperature modifying function and the establishment of the modified equilibrium temperature of said temperature controlled system comprising: a first temperature sensor having a relatively long time constant with respect to the time lag of said system, a second temperature sensor having a relatively shorter time constant than said first temperature sensor, means providing a control function related to a desired temperature of said controlled system, and means to combine said control function with a control function provided by said first and second temperature sensors to stabilize the temperature of said system around said desired temperature thereby minimizing hunting of said temperature controlled system.

14. A refrigeration system comprising:
a centrifugal compressor connected to compress refrigerant in a refrigeration circuit;
an electric motor connected for driving said centrifugal compressor;
refrigerant throttling means for reducing the load on said electric motor;
a shaded pole motor connected to control said refrigerant throttling means, said shaded pole motor having at least one shading winding for controlling the operation thereof;
sensing means for sensing a load on said motor; and
said sensing means being connected in an electrical circuit so as to electrically load or unload said shading winding in a manner to control said refrigerant throttling means to reduce the load on said compressor motor when said motor approaches a predetermined load condition.

15. A control circuit for a refrigeration system comprising the combination of:
an alternating current bridge circuit including at least one temperature sensitive element, said alternating current circuit providing an output voltage having a predetermined phase corresponding to the adjustment required in the capacity of said refrigeration system to provide a desired condition of operation,
a phase discriminator connected to said bridge circuit to sense the phase of the voltage output of said bridge circuit, and
refrigeration system capacity control means connected to said phase discriminator means and arranged so that the capacity of said refrigeration system is adjusted in accordance with the phase of the voltage output of said bridge circuit to cause said system to approach the desired operating condition.

16. A control circuit for a refrigeration system as defined in claim 15, said circuit comprising:
a centrifugal compressor connected to compress refrigerant in a refrigeration circuit;
an electric motor connected for driving said centrifugal compressor;
refrigerant throttling means for reducing the load on said electric motor;
actuating means arranged to control said refrigerant throttling means;
sensing means for sensing a load on said motor; and
said sensing means being connected to the output of said bridge circuit to provide a control signal which is summed with the output of said bridge circuit.

17. A control arrangement for a refrigeration system of the type having cooling means adapted to chill a fluid medium comprising:

means to sense the temperature of said fluid medium entering said cooling means, means to sense the temperature of chilled fluid leaving said cooling means, means to provide a desired set point temperature for the chilled fluid leaving said cooling means, means to control the capacity of said refrigeration system in response to one of said sensed temperatures, and means to reset the set point temperature of said system in response to the temperature sensed by the other of said sensed temperatures.

18. A temperature responsive probe comprising: a body member, a first temperature sensitive impedance element having a positive temperature coefficient disposed within said body member, a second temperature sensitive impedance element having a negative temperature coefficient disposed within said body member, said probe being constructed such that the thermal conductance between one of said temperature sensitive impedance elements and the exterior of said body member is greater than the thermal conductance between the other of said temperature sensitive impedance elements and the exterior of said body so as to provide a longer time lag in the response of said other impedance element than the time lag in the response of said one impedance element, said first impedance element being electrically connected in series with said second impedance element within the body of said probe, and means to make electrical connection with said impedance elements, said means to make electrical connection with said impedance elements consisting of only two conductors, one of said conductors being connected to one of said impedance elements and the other of said conductors being connected with the other of said impedance elements.

19. A control arrangement for controlling temperature of a system, said control arrangement comprising a first temperature sensor having a predetermined thermal time constant arranged to sense the temperature of said system, a second temperature sensor having a thermal time constant greater than that of said first temperature sensor arranged to sense the temperature of said system, temperature modifying means for modifying the temperature of said system, means providing a control function related to a desired temperature of said system, and means for combining said control function with an additional control function derived from said first and said second temperature sensors to actuate said temperature modifying means to modify the temperature of said system so as to minimize hunting of said temperature modifying means.

References Cited by the Examiner

UNITED STATES PATENTS

| | | |
|---|---|---|
| 2,777,640 | 1/57 | Kaufman. |
| 2,790,120 | 4/57 | Ducoff. |
| 2,892,916 | 1/59 | Holmes. |
| 2,964,922 | 12/60 | Canter _____ 62—160 |
| 2,972,684 | 2/61 | Elliott et al. |
| 2,983,111 | 5/61 | Miner et al. _____ 62—115 |
| 2,991,653 | 7/61 | Thompson. |
| 3,050,611 | 8/62 | Kamide. |
| 3,081,604 | 3/63 | Namisniak et al. ____ 62—115 X |
| 3,111,008 | 11/63 | Nelson. |
| 3,121,805 | 2/64 | Pinckaers. |

ROBERT A. O'LEARY, *Primary Examiner.*

LLOYD L. KING, *Examiner.*